Nov. 6, 1928.  1,690,829
D. V. MAZZOCCO
REGULATING APPARATUS
Filed May 29, 1924   2 Sheets-Sheet 1

INVENTOR
Dante Victor Mazzocco
BY
Edmund G. Borden
ATTORNEY

Nov. 6, 1928.　　　　　　　　　　　　　　　　1,690,829
D. V. MAZZOCCO
REGULATING APPARATUS
Filed May 29, 1924　　　　　2 Sheets-Sheet 2

Dante Victor Mazzocco INVENTOR

BY

Edmund G. Borden ATTORNEY

Patented Nov. 6, 1928.

1,690,829

UNITED STATES PATENT OFFICE.

DANTE VICTOR MAZZOCCO, OF NEW YORK, N. Y., ASSIGNOR TO THE SURFACE COMBUSTION CO. INCORPORATED, OF NEW YORK, N. Y., A CORPORATION OF NEW YORK.

REGULATING APPARATUS.

Application filed May 29, 1924. Serial No. 716,618.

This invention relates to regulating apparatus and aims to provide means for utilizing the position of an indicating needle to control the position of a member which presents substantial resistance to movement. The invention is of especial value when used as a part of governing mechanism, that is, mechanism designed to maintain a desired condition.

The invention relates particularly to the type of regulating apparatus which operates to cause movements of a member to be controlled at intervals and provides that each such movement be proportional in extent to the extent of the displacement of the needle of the apparatus from a given point at the time of the movement. An object of the invention is to provide regulating apparatus of this type in which it is not necessary to move the needle in its normal path of movement to effect a movement of the controlled member. A further object of the invention is to provide regulating apparatus of this type which may be used when the controlled member is located at a distance from the needle or when a powerful force is needed to control movement of the controlled member.

Regulating apparatus embodying the invention includes the combination with a movable needle of means located at one side of the path of travel of the needle and adapted to engage a side of the needle at intervals and to remain in contact with the needle on each engagement for a length of time proportional to the extent of the displacement of the needle from a given point at the moment of the engagement. Each contact between the engaging member and the needle is utilized to cause, either directly or indirectly, a movement of the controlled member during the time of such contact. The apparatus is most desirably arranged in such manner that the direction of each movement given to the controlled member corresponds to the direction in which the controlling member is displaced from a given point at the time of such movement.

Regulating apparatus embodying the invention may be used to control the position of various mechanical devices in accordance with the movements of any suitable indicating needle or the like. It may be used as a part of thermostatic mechanism, as a part of mechanism to govern the amperage or voltage of electric currents, to control the steering mechanism of a vessel in accordance with the position of a compass needle, and for many other purposes. For the sake of illustration, I will describe the use of a specific electrical regulating apparatus embodying the invention and arranged to position a damper in accordance with the position of the needle of a galvanometer. Such an embodiment of the invention is illustrated in the accompanying drawings; in which Fig. 1 is a top view of the controlling apparatus and the parts associated therewith, the cover of the casing in which the parts are located being removed;

Figure 1:
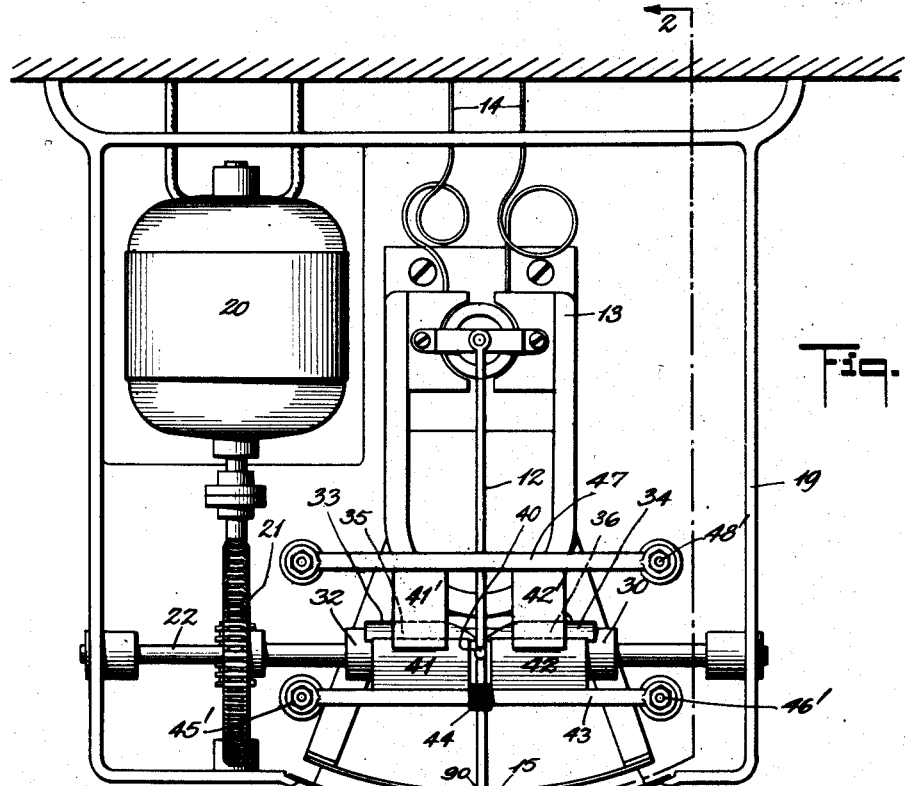

The regulating apparatus shown in the drawings serves to control the position of a damper 10 in a pipe 11 in accordance with the position of the needle 12 of a galvanometer 13. So far as the operation of the regulating apparatus is concerned, it is not essential that the position of the controlled member, as for example, the damper 10, have any effect upon the conditions which determine the position of the needle 12. The regulating apparatus, however, produces its greatest advantages when such a connection exists so that the regulating apparatus may form part of governing mechanism.

In order to explain a specific use of the regulating apparatus it may be assumed that the leads 14 of the galvanometer 13 are connected to a thermocouple which is subjected to heat produced in a furnace supplied with air through the pipe 11, so that an increase in the furnace heat caused by an opening of the damper 10 moves the needle 12 in one direction, while a decrease in the furnace heat caused by a closing of the damper 10 moves the needle 12 in the opposite direction. A pointer 15 at the end of the needle may cooperate with a scale 16 to indicate the temperature attained in the furnace, and the needle 12 may be moved toward the end 17 of the scale by an increase in temperature and toward the end 18 by a decrease in temperature. Under these circumstances, the regulating apparatus will operate to control the position of the damper 10 in a manner to maintain any desired temperature in the furnace.

The needle 12, the galvanometer 13 whose coils actuate the needle, and the parts of the regulating mechanism associated with the needle are located in a casing 19. These parts are driven by a motor 20 which is operated at a uniform speed. A constant speed electric motor is satisfactory for the purpose. The shaft of the motor 20 is connected through reducing gearing 21 to a shaft 22 which extends adjacent to the needle 12. The shaft 22 is located at one side of, for example, below, the path of normal movement of the needle 12, and in the general direction of such movement. The direction of rotation of the shaft 22 is indicated by an arrow in Fig. 2.

A cam generally indicated by numeral 30 is secured on the shaft 22. The cam 30 comprises a sleeve 32 on which are two projections 33 and 34 providing raised cylindrically curved engagement surfaces 35, 36. Each projection is widest at its outer end. The projections decrease in width toward a central point 37. The engagement surfaces 35 and 36 are so shaped that when developed each is triangular in form. It follows that the arcuate width of either engagement surface at any point is proportional to the distance of that point from the central point 37 of the cam.

The shaft 22 is positioned at such distance from the needle 12 that the cylindrical surface 32 of the cam sleeve 30 is out of contact with the needle, while one or the other of the engagement surfaces 35, 36, engages one side, for example, the bottom, of the needle on each revolution of the cam. It is not essential that the path of the normal movement of the needle be horizontal. Regardless of the direction in which the needle may move, the shaft 22 may be positioned at one side of the path of its movement, so that the engagement surfaces 35, 36 come into contact with one side of the needle, that is to say, with a surface of the needle which is neither in front nor behind when the needle moves in its normal path of movement. It results from the shape of the engagement surfaces that wherever the needle 12 may be positioned in its path of travel when one of these surfaces engages it, this surface remains in contact with the needle for a length of time proportional to the amount of the displacement of the needle along its normal path of travel from a point directly over the central point 37 of the cam.

Figure 2:
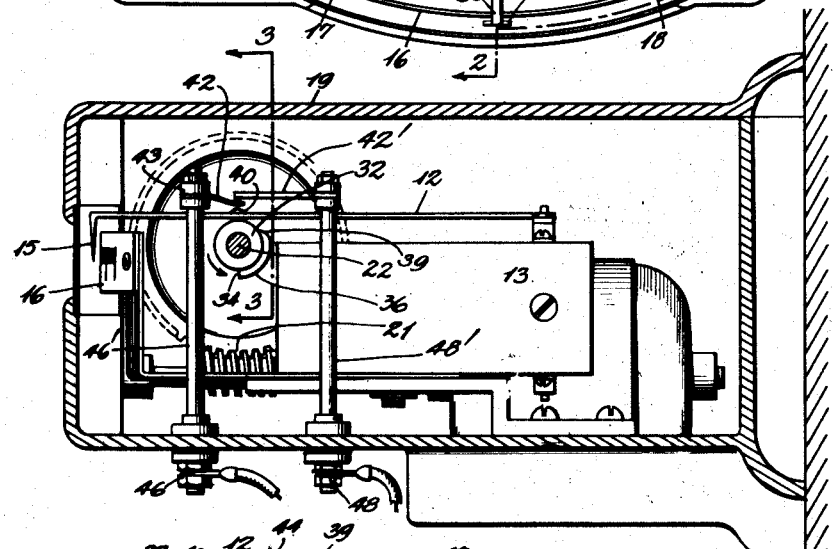
Fig. 2 is a side elevation of the apparatus shown in Fig. 1 sectioned on the line 2—2 of Fig. 1.
Figure 3:
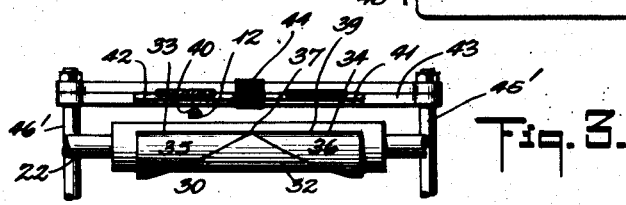
Fig. 3 is a fragmentary section on the line 3—3 of Fig. 2.
Figure 4:
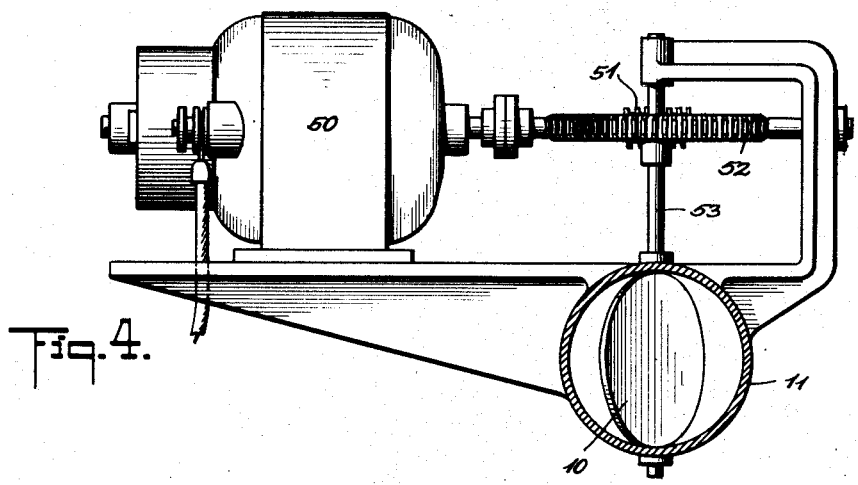
Fig. 4 is a side elevation of a controlled member and the parts associated with it.

Means are provided for utilizing the contact between one or the other of the engagement surfaces 35, 36 and the needle for effecting movement of the damper 10 during the time of each contact. While such means may include an electric circuit which is completed through the needle and one of the projections of the cam when these are in contact with each other, I find it more desirable to position the cam 30 so that its projections displace the needle laterally from its normal path of travel and to utilize such lateral displacement of the needle to actuate apparatus for moving the damper. In the form illustrated, the front edges 39 of the projections 33, 34 are bevelled as shown in Fig. 2 and the shaft 22 is placed so near the needle that when one or the other of the projections engages the needle it moves the needle upwardly out of its normal path of travel. The needle is held in such raised position during the time that one or the other of the engagement surfaces 35, 36 is in contact with it. The upward displacement of the needle from its normal path of travel is utilized to effect movement of the damper during the time of such displacement.

Instead of using mechanical means to cause the upward displacement of the needle to effect movements of the damper, I find it more desirable to use electrical means for this purpose. Such means may include an electric circuit which is closed, opened, or otherwise affected, when the needle is displaced upwardly, and a mechanism responsive to a current change in said circuit to cause movements of the controlled member.

In the specific form illustrated, upward displacement of the needle closes an electric circuit containing relay coils, and the controlled member 10 is moved by an electric motor to which current is supplied through a reversing switch controlled by these relay coils. In order to provide for the closing of an electric circuit, the needle carries a projection 40 on its upper side, and two flexible contact pieces 41 and 42 are located above the needle and normally out of contact with fixed contact pieces 41', 42' located above them. The contact pieces 41', 42' are connected through a bar 47 and post 48' to a terminal 48 mounted on the casing 19. The contact pieces 41 and 42 may consist of pieces of flexible and resilient sheet metal mounted on a cross bar 43 comprising two parts of conducting material separated by insulated material 44 at its center and supported at its ends by posts 45', 46' of conducting material. The contact piece 41 is connected through one portion of the bar 43 and the post 45' to a terminal 45, while the contact member 42 is similarly connected through the other part of the bar 43 and the post 46' with a terminal 46.

An electric motor 50 is used to move the damper 10. The shaft of this motor carries a worm 51 which meshes with the gear 52 fixed on a shaft 53 on which the damper 10 is mounted. The motor 50 is provided with an automatic brake which stops the rotation of the motor as soon as the current through its armature is interrupted. As such automatic brakes are commonly used on sewing machine motors, and their construction and arrangement are well known, the brake is not illustrated or described herein.

Figure 5:
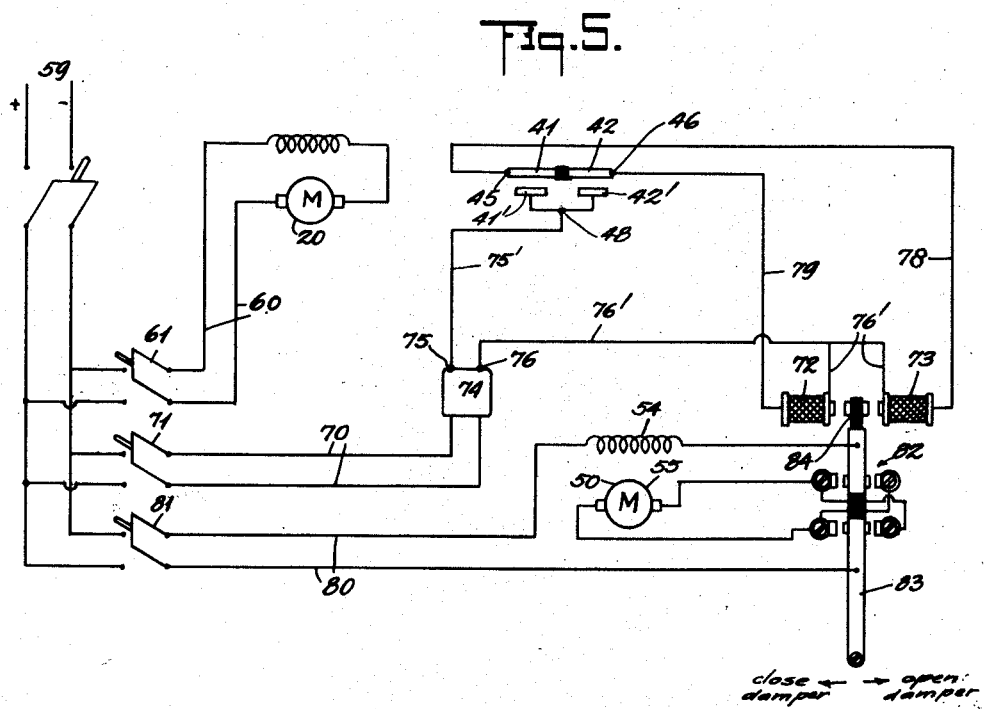
Fig. 5 is a diagram of the electrical connections of the complete apparatus.

The electrical connections of the apparatus are shown in Fig. 5. Three electric circuits 60, 70, 80 are connected with a main supply line 59 through switches 61, 71, 81, respectively. The circuit 60 contains the motor 20 which drives the shaft 22.

The circuit 70 contains the relay coils 72, 73 of a reversing switch 82. The voltage in the circuit 70 may be reduced by a transformer 74. One of the low potential output terminals 75 of the transformer is connected by a conductor 75' to the terminal 48 which is connected with the fixed contact pieces 41', 42'. The other low potential output terminal 76 of the transformer is connected by conductors 76' to one end of each of the two relay coils 72, 73. The other ends of these coils are connected respectively by conductors 78, 79, to the terminals 45 and 46 and through them to the flexible contact pieces 41 and 42.

The circuit 80 contains the motor 50. The field 54 and the armature 55 of this motor are connected through the reversing switch 82 in such manner that, while current passes through the field always in the same direction, the direction of the current through the armature depends upon the position of the reversing switch. The movable contact pieces of this switch are mounted on a pivoted arm 83 which bears an armature 84 located between the relay coils 72, 73. By a spring or other means not shown in the drawing, the lever 83 is normally positioned as shown in Fig. 5 with its armature 84 located centrally between the coils 72 and 73 and with its movable contact pieces out of contact with its fixed contact pieces. In this normal position of the reversing switch, no current flows through the motor 50 and the motor is inactive. When the armature 84 is pulled toward the coil 72, current flows through the armature 55 in such a direction that the motor 50 operates to close the damper 10. Conversely, when the armature 84 is pulled toward the coil 73, the motor 50 operates to open the damper 10.

The operation of the regulating apparatus described, when used as part of a mechanism such as referred to for governing furnace temperature, is as follows:—

The switches 61, 71 and 81 being closed, the motor 20 will be operated continuously at a uniform speed so that the shaft 22 is rotated continuously at a uniform speed. Except when one of the projections 33 or 34 engages the needle, the needle is free to assume the position into which it is urged by the coil of the galvanometer 13. As the projections can engage the needle during only a comparatively small part of each revolution of the shaft 22, the position of the needle 12 corresponds to the actual temperature in the furnace. At regular intervals, that is to say, on each revolution of the shaft 22, the cam 30 raises the needle out of its normal path of travel. If at the time of any such engagement the needle is at a given point 90 of its path of movement, which in the form shown is the central point of the path, directly over the central point 37 of the cam 30, it is raised into the space between the contact members 41 and 42 and, therefore, has no effect on the circuit 70. If, however, the needle happens to be displaced from the given point 90 when it is engaged and raised by one of the cam projections 33 or 34, one or the other of the flexible contact pieces 41 or 42 is brought into contact with the corresponding fixed contact piece 41' or 42' and held in such contact for a time proportional to the amount of the displacement of the needle from the given point 90 at the time of the engagement. During such time as the contact piece 42 is in engagement with the contact piece 42', the circuit 70 is closed through the relay coil 72 and the reversing switch 82 is so positioned that the motor 50 operates to cause a closing movement of the damper 10. When, on the other hand, the contact piece 41 is in contact with the contact piece 41', the motor 50 is operated in the opposite direction, causing an opening movement of the damper 10. In either case, the time during which the motor 50 operates is the same as the time during which the needle 12 is displaced upwardly by the projection 33 or the projection 34. As the motor 50 is operated at a substantially uniform speed it follows that the extent to which it opens or closes the damper 10 on each engagement of one or the other projections with the needle is proportional to the extent of the displacement of the needle from the given point 90 at the time of that engagement.

The entire mechanism thus constitutes a governor reducing the supply of air to the furnace when the temperature exceeds a desired temperature and increasing the supply of air to the furnace when the temperature falls below this temperature. The adjustments are made at frequent and regular intervals and the movement of the damper at each adjustment is proportional to the difference between the actual temperature and the desired temperature at the time of the adjustment. It is, therefore, possible to provide that the change in the position of the damper at each adjustment shall cause just the change in the air supply necessary to bring the actual furnace temperature back to the desired furnace temperature. Governing mechanism provided with regulating apparatus embodying my invention is, therefore, capable of maintaining a substantially constant temperature.

The utility of regulating apparatus embodying the invention is by no means limited to the specific use of such mechanism which has been described. Since, so far as the operation of the regulating apparatus is concerned, the manner in which the needle is moved and the function of the controlled member are immaterial, it is apparent from the description which has been given that the regulating apparatus may be incorporated in governing mechanism for maintaining uniform conditions of all sorts, such as uniform conditions of the flow of an electric current or of the voltage of an electric current, or uniform position of apparatus of any sort. Furthermore, the regulating apparatus need not be a part of the governing mechanism but may be used to control the position of any member in accordance with movements of a needle whose position is not affected by that of the controlled member.

The invention is by no means limited to the particular mechanical apparatus embodying it which has been shown and described, but comprehends other constructions in which means are provided for engaging the needle at intervals and in which each engagement, either directly or indirectly, effects a movement of the controlled member proportional to the extent of the displacement of the needle at the time of the engagement. It is not essential that the movement of the needle be caused through a movement imparted to the needle by the engaging means.

It will be understood that the term "needle" as used herein is to be taken as a term of description and not of limitation, that is, as descriptive of an element which may be moved by a slight force, and that the term "controlled member" or "member to be controlled" is to be taken as descriptive of a means which is to be moved or regulated in accordance with the displacement of the needle.

What is claimed is:

1. The combination with a movable needle and a member to be controlled in accordance with the position of the needle, of means located at one side of the normal path of movement of the needle and adapted to engage a side of the needle at intervals and at each such engagement to remain in contact with the needle for a time proportional to the extent of the displacement of the needle from a given point at the moment of that engagement, and means for causing movement of the controlled member during the time that the engaging means is in contact with the needle.

2. The combination with a movable needle and a member to be controlled in accordance with the position of the needle, of a first engaging means located at one side of the normal path of movement of the needle and adapted to engage a side of the needle at intervals when the needle is displaced in one direction from a given point of its path and at each such engagement to remain in contact with the needle for a time proportional to the extent of the displacement of the needle from said given point at the moment of that engagement, a second engaging means positioned at one side of the normal path of movement of the needle and adapted to engage a side of the needle at intervals when the needle is displaced in the opposite direction from said given point and at each such engagement to remain in contact with the needle for a time proportional to the extent of the displacement of the needle from said given point at the moment of that engagement, and means for causing movement of the controlled member in one direction during the time when the first engaging means is in contact with the needle and for causing movement of the controlled member in the opposite direction during the time when the second engaging means is in contact with the needle.

3. The combination with a movable needle and a member to be controlled in accordance with the position of the needle, of means operative at regular intervals to move the needle laterally out of its normal path of movement and to retain it out of its normal path of movement for a time proportional to the extent of the displacement of the needle from a given point at the moment of such lateral movement, and means set into operation by such lateral movement of the needle to cause the controlled member to move at a uniform rate during the time that the needle is displaced laterally from its normal path of movement.

4. The combination with a movable needle and a member to be controlled in accordance with the position of the needle, of means located at one side of the normal path of movement of the needle adapted to engage the controlling member and move it laterally out of its normal path of movement at regular intervals and to retain it out of its normal path of movement on each such engagement for a time proportional to the extent of the displacement of the needle from a given point at the moment of such engagement, a contact member located at the other side of the normal path of movement of the needle so as to be engaged by the needle on such lateral movement thereof, and means set into operation by such engagement to cause the controlled member to move during the time that the needle is in engagement with said contact member.

5. The combination with a movable needle and a member to be controlled in accordance with the position of the needle, of means located at one side of the normal path of movement of the needle and adapted to engage the needle and move it laterally out of its normal path of movement at intervals and to retain it out of its normal path of movement at each such engagement for a time proportional to the extent of the displacement of the needle from a given point at the moment of such engagement, two contact members located at the other side of the normal path of movement of the needle and at opposite sides of said given point, and means set into operation by engagement between the needle and said contact members to cause the controlled member to move in one direction during the time that the needle is in engagement with the one of them and to cause the controlled member to move in the opposite direction during the time that the needle is in engagement with the other of them.

6. The combination with a movable needle and a member to be controlled in accordance with the position of the needle, of an electric circuit, means adapted to engage the needle at intervals and on each such engagement to remain in contact with the needle and to cause a change of current in said circuit for a time proportional to the extent of the displacement of the needle from a given point at the moment of that engagement, and means responsive to such current change in said circuit to cause the controlled member to move at a uniform rate during the continuance of such change.

7. The combination with a movable needle and a member to be controlled in accordance with the position of the needle, of a rotary shaft located adjacent to the normal path of movement of the needle, a cam on said shaft having a raised surface of triangular shape adapted to engage the needle on each revolution of the shaft, and means for causing uniform movement of the controlled member during the time that said surface is in contact with the needle.

8. The combination with a movable needle and a member to be controlled in accordance with the position of the needle, of a rotary shaft extending adjacent to the normal path of movement of the needle and in the general direction of such path of movement, a cam on said shaft having a raised engaging surface of triangular form tapering to a point near the center of the cam and a second raised engaging surface of triangular form tapering to said point, each of said surfaces being widest at its outer end and being adapted to engage the needle, and means set into operation by lateral displacement of the needle to cause movement of the controlled member in one direction during such time as the needle is laterally displaced by the first engaging surface and to cause movement of the controlled member in the opposite direction during such time as the needle is laterally displaced by the second engaging surface.

9. The combination with a pivoted needle and a member to be controlled in accordance with the position of the needle, of a rotary shaft extending adjacent and parallel to a chord of the arc of movement of a point of the needle, a cam on said shaft having a raised engaging surface of triangular form tapering to a point near the center of the cam and a second raised engaging surface of triangular form tapering to said point, each of said surfaces being widest at its outer end and being adapted to engage the needle, and means for causing movement of the controlled member in one direction during the time that the first engaging surface is in contact with the needle and for causing movement of the controlled member in the opposite direction during such time as the second engaging surface is in contact with the needle.

10. The combination with a movable needle and a member to be controlled in accordance with the position of the needle, of a rotary shaft extending adjacent to the normal path of movement of the needle and in the general direction of such path of movement, a cam on said shaft having a raised engaging surface tapering to a point near the center of the cam and a second raised engaging surface tapering to said point, each of said surfaces being widest at its outer end and being positioned to engage and laterally displace the needle, and means set into operation by lateral displacement of the needle to cause movement of the controlled member in one direction during such time as the needle is laterally displaced by the first engaging surface and to cause movement of the controlled member in the opposite direction during such time as the needle is laterally displaced by the second engaging surface.

11. The combination with a movable needle and a member to be controlled in accordance with the position of the needle, of a rotary shaft extending at one side of the normal path of movement of the needle and in the general direction of such path of movement, a cam on said shaft having a first raised engaging surface tapering to a point near the center of the cam and a second raised engaging surface tapering to said point, each of said surfaces being widest at its outer end and being adapted to engage and laterally displace the needle, two actuating means located at the other side of the normal path of movement of the needle and at opposite sides of the central point of said cam, and means set into operation by engagement between the needle and said actuating means to cause movement of the controlled member in one direction during such time as the needle engages the one of said actuating means and to cause movement of the controlled member in the opposite direction during such time as the needle engages the other of said actuating means.

12. The combination with a movable needle and a member to be controlled in accordance with the position of the needle, of means adapted to periodically engage one side of said needle and upon each such engagement to remain in contact with the needle for a time proportional to the extent of the displacement of the needle from a given point at the moment of that engagement, and means for causing movement of the controlled member during the time that the engaging means is in contact with the needle.

In testimony whereof I affix my signature.

DANTE VICTOR MAZZOCCO.